US006484262B1

(12) United States Patent
Herzi

(10) Patent No.: US 6,484,262 B1
(45) Date of Patent: Nov. 19, 2002

(54) NETWORK CONTROLLED COMPUTER SYSTEM SECURITY

(75) Inventor: Dirie Herzi, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,637

(22) Filed: Jan. 26, 1999

(51) Int. Cl.$^7$ ............................................... G06F 11/30
(52) U.S. Cl. ...................................................... 713/201
(58) Field of Search ............................... 713/1, 2, 200, 713/201, 300, 100, 202; 709/223, 224, 225, 226, 227, 228, 229, 222; 710/25; 714/14, 23, 24, 34, 36, 55

(56) References Cited

U.S. PATENT DOCUMENTS

| | | |
|---|---|---|
| 4,696,449 A | 9/1987 | Woo et al. |
| 5,055,827 A | 10/1991 | Philipp |
| 5,154,456 A | 10/1992 | Moore et al. |
| 5,287,519 A | 2/1994 | Dayan et al. |
| 5,349,643 A | 9/1994 | Cox et al. |
| 5,475,839 A | 12/1995 | Watson et al. |
| 5,574,786 A | 11/1996 | Dayan et al. |
| 5,632,165 A | 5/1997 | Perry |
| 5,680,547 A | 10/1997 | Chang |
| 5,691,928 A | 11/1997 | Okaya et al. |
| 5,796,942 A | 8/1998 | Esbensen |
| 5,826,015 A * | 10/1998 | Schmidt |
| 5,892,906 A * | 4/1999 | Chou et al. |
| 5,978,912 A * | 11/1999 | Rakavy et al. |
| 6,189,100 B1 * | 2/2001 | Barr et al |
| 6,243,813 B1 * | 6/2001 | Kong |
| 6,263,388 B1 * | 7/2001 | Cromer et al. |

OTHER PUBLICATIONS

Microsoft Computer Dictionary, 1994, Microsoft Press, pp. 69. 146,261, 355.*

* cited by examiner

Primary Examiner—Gail Hayes
Assistant Examiner—Jenise Jackson
(74) Attorney, Agent, or Firm—Michael J. Balconi-Lamica; Haynes and Boone, LLP

(57) ABSTRACT

A computer system having network controlled security administered in conjunction with a prescribed network server of a computer network includes at least one processor, at least one memory, and a device for communicating with the prescribed network server. Operating system software is provided for use in booting up an operating system. The computer system further includes basic input output system (BIOS) firmware, the BIOS having a security measure. The security measure is implemented by the processor prior to a booting up of the operating system and in conjunction with the prescribed network server. Booting up of the operating system by the processor is controlled in response to the security measure.

32 Claims, 1 Drawing Sheet

NETWORK CONTROLLED COMPUTER SYSTEM SECURITY

BACKGROUND

The disclosures herein relate generally to computer systems, and more particularly, to security of a computer system such as a portable notebook computer.

Current security measures used with respect to portable computers and computer systems fail to prevent authorized users from stealing a respective portable computer or computer system. One current security measure includes use of a system password for enabling a user to use the computer system. The system password however does not prevent anyone who knows the password (e.g., an authorized user) from stealing the computer and thereafter being able to continue using the computer. Another security measure includes the use of a hard disk drive password. The use of a hard disk drive password only serves to protect the hard disk drive, and can be bypassed by merely replacing the hard disk drive. Other security measures include the use of various locks and other physical attachment devices. A committed individual can forcibly remove such physical attachments, whereas, an authorized user with an appropriate key can merely use the key to unlock the computer from its physical constraint and thereby steal the computer. Lastly, a security measure making use of operating system level passwords can be bypasses by reinstalling of the computer operating system. The use of operating system level passwords thus does not provide a very high level of security against computer theft by an authorized user.

It would thus be desirable to provide an improved level of security and an improved security measure against undesired theft of a computer system, especially, a portable computer system.

SUMMARY

According to one embodiment, a computer system having network controlled security administered in conjunction with a prescribed network server of a computer network includes at least one processor, at least one memory, and a device for communicating with the prescribed network server. Operating system software is provided for use in booting up an operating system. The computer system further includes basic input output system (BIOS) firmware, the BIOS having a security measure. The security measure is implemented by the processor prior to a booting up of the operating system and in conjunction with the prescribed network server. Booting up of the operating system by the processor is controlled in response to the security measure.

The embodiments of the present disclosure advantageously provide an improved level of security and an improved security measure against undesired theft of a computer system, especially, a portable computer system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 1:
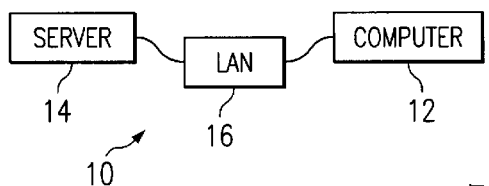
FIG. 1 illustrates a computer network for implementing network controlled security of a computer system according to one embodiment of the present disclosure.

Referring briefly to FIG. 1, a computer network 10 for implementing network controlled security of a computer system 12 according to one embodiment of the present disclosure is illustrated. A prescribed network server 14 provides administration of the security measure, further as discussed herein. The computer system 12 is coupled to the network server 14 via any suitable interface 16 for communicating between the same, such as with the use of a local area network interface, Internet connection, Intranet connection, modem, or the like. Computer 12 can include any type of computer system, such as a desktop personal computer system unit or a portable (notebook) personal computer system unit. Computer network 10 for implementing network controlled security of a computer system can thus include a network server 14 for administering network controlled security and at least one computer system 12, as further discussed herein.

Figure 2:
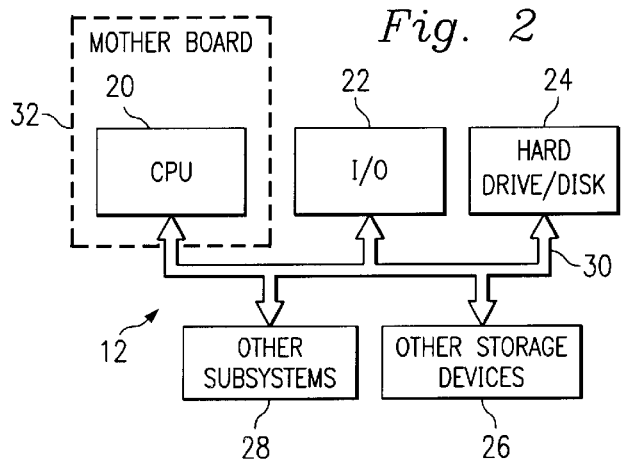
FIG. 2 illustrates a block diagram of a computer having network controlled security according to one embodiment of the present disclosure.

Turning now to FIG. 2, a system block diagram of computer system 12 configured in accordance the present embodiments as discussed herein is shown. The computer system 12 includes a central processing unit (CPU) 20, input/output (I/O) devices, such as a display, a keyboard, a mouse, and associated controllers, collectively designated by a reference numeral 22, a hard disk drive 24, and other storage/memory devices, such as a may include a floppy disk drive, CD-rom drive, random access memory (RAM), non-volatile random access memory (NVRAM), read only memory (ROM) and other memory devices, collectively designated by a reference numeral 26, and various other subsystems, such as a network interface card (or NIC), modem, timer, collectively designated by a reference numeral 28, all interconnected via one or more buses, shown collectively in FIG. 2 as a bus 30.

The computer system 12 further includes a motherboard 32. The processor 20 is disposed on the motherboard 32. In addition, any RAM, NVRAM or ROM of the storage devices 26 may also be disposed upon motherboard 32.

With reference to FIGS. 1 and 2, the computer system 12 having network controlled security administered in conjunction with the prescribed network server 14 shall be further discussed. The computer system includes at least one processor 20, at least one storage/memory (24,26), and a device 28 for communicating with the prescribed network server 14. The storage/memory (24,26) includes prescribed operating system software provided therein for use in booting up a prescribed operating system. Computer system 12 further includes basic input output system (BIOS) firmware. The BIOS firmware is disposed in a read only memory (ROM) of the storage devices 26. The BIOS firmware includes a security measure. The security measure is implemented by the processor 20 prior to a booting up of the operating system and in conjunction with the prescribed network server 14. Booting up of the operating system by the processor is controlled in response to the security measure. The BIOS firmware may further include a power on self test (POST), wherein the security measure is further for controlling an execution of the power on self test by said processor.

In addition to the above, the computer system 12 further includes an authentication timer for use in timing a duration of a prescribed network security authentication interval. The authentication timer includes a software timer using an encrypted count, the encrypted count being stored in a non-volatile random access memory of the storage devices (26). In a preferred embodiment, the software timer is updated with the use of periodic system management interrupts (SMI). SMI is a highest level interrupt in the computer system and used by the BIOS only. In another embodiment, the software timer is updated with the use of periodic system configuration interrupts (SCI).

With respect to the authentication timer and SMI, the timer may be established where an SMI is generated on one minute intervals. In an SMI mode, the timer value can be decremented. The decremented timer value can then be written back into a NVRAM, the value being in an encrypted form not readily recognizable by a typical user. The encrypted timer value could also be stored in a flash memory or a BIOS memory.

The security measure of the BIOS further enables the processor 20 to communicate an authentication request to the prescribed network server 14, causing the processor to await a network controlled security authentication response, and resetting the authentication timer in response to the network controlled security authentication response. Upon an expiration of the authentication timer, booting of the operating system by the processor 20 is prevented until the network controlled security authentication response has been received and the authentication timer has been reset in response to the network controlled security authentication response. In one embodiment, the prescribed network security authentication interval is a fixed interval. In another embodiment, the prescribed network security authentication interval is an interval subject to being changed in accordance with requirements of a particular network controlled security implementation.

The BIOS firmware may further include executable instructions to be carried out by the processor 20 for determining if the network controlled security authentication response is a valid response. If valid, then the processor 20 would proceed in resetting the authentication timer. If no valid, then the processor 20 would continue awaiting receipt of a valid network controlled security authentication response.

The computer system 12 may further include a setup response timer. The setup response timer is provided for timing out the awaiting of the network controlled security authentication response from the network server. In the event that a response from the network server is not received within a prescribed setup interval, the processor would check to determine if the authentication timer has expired. If the authentication timer has not expired, then the processor would continue with POST and OS loading.

Further according to the present embodiments, the security measure includes a direct communication link established between a server based management application and a computer system level software BIOS. Such a communication link provides for enhancing security of the computer system and deterring its theft, as discussed herein. The security measure requires an authorization to operate from a prescribed network server. Without the authorization, the BIOS of the computer system halts all practical operation of the computer system, until such time as the network authorization is received.

According to the present embodiments, the authorization occurs prior to a booting up of the operating system of the computer system. As a result, the security measure is advantageously made independent of the particular computer's operating system and hard drive. In addition, the security measure is silent and does not require any computer user input. Furthermore, the security measure is always active.

For computers which are not expected to operate outside of a network, the security measure as discussed herein can implement the authentication upon every boot of the particular computer system. It is not necessary to get an authorization to boot on every boot however, for instance, with respect to portable computers or computers intending to operate in a stand-alone mode. Portable computers or other computers in a stand-alone mode are likely to operate remotely without a network connection at various times. However, it is still required that the computer system incorporating the security measure of the present disclosure receive an authorization during a specified time period, or security check interval. Such a time period or security check interval may include a daily interval, weekly interval, monthly interval or any other duration of time as may be established for a given security policy.

The security check interval may further include a interval which is selectable according to the type of computer system incorporating the security measure. For instance, a portable computer may be assigned a first security check interval and a desktop computer system which is not expected to operate without a network connection may be assigned a second security check interval. The first security check interval can be made longer than the second security check interval, according to a particular security policy.

Figure 3:
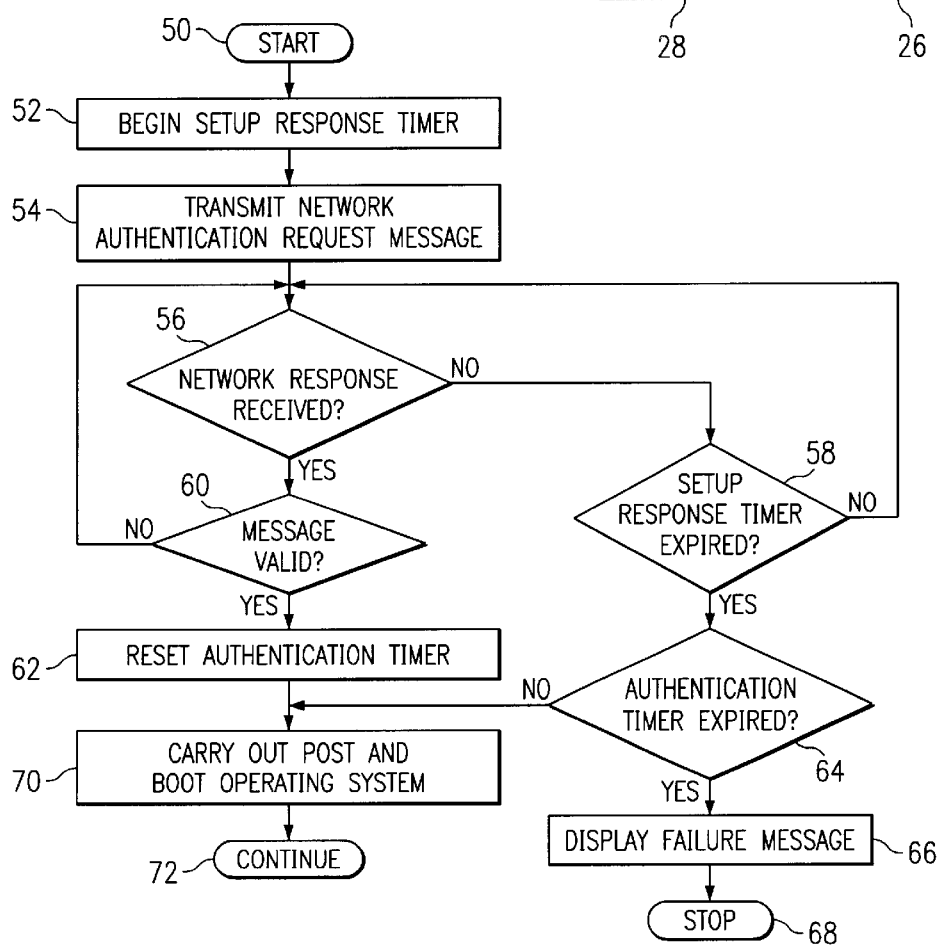
FIG. 3 illustrates a flow diagram of the security measure for use with the computer system in conjunction with a prescribed network server according to one embodiment of the present disclosure.

With reference now to FIG. 3, a method of network controlled security of a computer system administered in conjunction with a prescribed network server shall be discussed beginning with step 50. In step 52, a setup response timer is started. As discussed above, the security measure includes a setup response timer. The setup response timer implements a network response waiting period.

In step 54, a network authentication request message is transmitted to the network server. In step 56, an inquiry is made as to whether or not the network response has been received. If not, then the process proceeds to step 58. In step 58, an inquiry is made as to whether or not the setup response timer has expired. If not, then the process returns to step 56 as shown.

The waiting period includes a specified period of time during which a particular computer system waits for a network response upon a boot up of the computer system. The waiting period or time interval for the setup response timer may include on the order of a few seconds to several minutes, as may be established for a particular network connection. The setup response timer is used for initiating a given action, to be discussed further herein, upon expiration of the setup response timer interval (step 58). The setup response timer is necessary so as not to wait indefinitely for a network response. The setup response timer may include a software implemented timer, a chipset based timer, or any other suitable timer contained within the computer system for providing the desired network response waiting period.

Returning briefly to step 54, the BIOS creates a special packet containing a Network Authentication Request (NAR) message. The NAR message is intended to be received by a management software running on a host server for the given network to which the computer system is connected. The NAR message can further include at least an identity, such as a serial number, asset tag number, or the like, which identifies the specific computer to the host server. The host server responds with an Authenticating Message (AM). The AM message may include the contents of the original NAR message plus a signature. The signature may contain an encrypted key that only the prescribed host server can generate. Alternatively, the signature may include a predefined packet that the client side BIOS understands to be a valid message for resetting the authentication timer. In step 56, if a network response has been received, then the process proceeds with step 60.

In step 60, an inquiry is made as to whether or not the message is a valid message. That is, the BIOS firmware includes executable instructions to be carried out by the processor for determining if the network controlled security authentication response is a valid response, and if valid, then resetting the authentication timer in step 62. If not valid, the process returns to step 56 to await receipt of a network response. To further improve a security, the client computer system and host server may use key pairs, such as defined, for example, in Wired For Management Baseline Ver. 1.81, Section 5.2.4. or any other private and public keys and their implementation as known in the art. The same key pair used to receive digitally signed boot images would be used to receive a digitally signed Authenticating Message that can be verified by the BIOS on the client computer system. That is, the digitally signed Authenticating Message can be used by the BIOS of the client computer system to verify that the Authenticating Message is coming from a legitimate server.

The client computer waits for a response from the server before the setup response timer waiting period expires (Steps 56 and 58). During the waiting period, the response timer continues to run or count down.

If the setup response timer expires (Step 58), then the BIOS proceeds with a check up on the Authentication Timer (Step 64). The Authentication Timer can include a software timer stored in non-volatile memory of the computer system. The authentication timer starts with a selected value, usually established and setup by a network administrator or person having a high security clearance in connection with the particular computer security policy. The BIOS counts down the authentication timer at a system level on a regular basis. Upon an expiration of the authentication timer, the process continues at Step 66, where an appropriate failure message is displayed on the computer display. For example, a message indicating that network authentication is required can be displayed. Upon reaching Step 66, the BIOS will not thereafter boot the particular computer system without first receiving an authentication from the prescribed network server (Step 68). Furthermore, the authentication timer is preferably updated during a prescribed periodic system management interrupt (SMI) within the computer system. The authentication timer is a counter which counts each time the prescribed periodic system management interrupt is generated. The counter value is preferably stored in non-volatile random access memory (NVRAM). The counter value can further be encrypted with the use of any suitable encryption algorithm. The counter value may further be stored in a checksum region of the NVRAM.

When the setup response timer has expired (Step 58) and the authentication timer has not (Step 64), the BIOS allows a power on self test (POST) and operating system (OS) booting (Step 70). A normal operation of the computer system continues in Step 72. If the authentication timer has expired (Step 64), then the BIOS prevents and/or halts POST and OS booting. If the authentication timer is set to zero, then authentication will be required on every boot. If POST were not included in the BIOS firmware, then, at a minimum, the BIOS halts the OS booting and thus effectively halts all practical continued usage of the computer system until an authentication message is received.

In addition to the above, when the computer system is undergoing a transition from a low power mode to a full power mode while connected to the network server, authentication may be required if the authentication timer expires. That is, protection can be provided against any attempted bypassing of the security measure through the suspending of the computer system and never turning the computer system off. In this case, when the BIOS is bypassed by the OS, appropriate advanced configuration and power interface (ACPI) steps are implemented that check the authentication timer and halt the resuming of full power mode operation upon an expiration of the authentication timer. Furthermore, in an ACPI environment when periodic SMI are not allowed, an embedded controller of the computer system is used to generate a periodic system configuration interrupt (SCI). The periodic system configuration interrupt would function in a manner similar to that discussed herein with respect to the periodic SMI for updating of the authentication timer.

Returning briefly to Step 56, if an authenticating message is received from the network server prior to expiration of the setup response timer, the message can then be verified in Step 60 to determine that it is originating from a legitimate source. Upon verification of the authenticating message, the authentication timer is reloaded with the original authentication timer value in Step 62 and BIOS continues with POST and OS loading in Step 70, as discussed. A normal operation of the computer system continues in Step 72. Upon a failure to validate a message in Step 60, the BIOS returns to Step 56 and continues checking for a network response, while the setup response timer continues to count down.

The present embodiments advantageously provide an improved security measure for a computer system. The present embodiments utilize a client-server architecture. The security measure is furthermore highly advantageous in connection with a portable computer, since circumventing of the security measure would require replacement of the computer system's motherboard and wherein the motherboard makes up a large percentage of the portable computer system. According to the embodiments of the present disclosure, the computer system is effectively rendered useless in the absence of an authentication timer reset from a prescribed network server. The present embodiments advantageously provide a BIOS level security measure which can be actuated and run during a POST and prior to an operating system boot of the computer system.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system having network controlled security administered in conjunction with a prescribed network server, said computer system comprising:

at least one processor;

at least one memory;

operating system software for use in booting up an operating system;

device for communicating with the prescribed network server;

basic input output system (BIOS) firmware including a network controlled security measure, the security measure implemented by said processor prior to a booting up of the operating system and in conjunction with the prescribed network server, the security measure configured to require an authentication from the prescribed network server to operate and, without authentication, the security measure configured to halt practical operation of the computer system until such time as the network authentication is received, wherein the security measure controls the booting up of the operating system by said processor by one selected from allowing booting up and preventing booting up, and an authentication timer, said authentication timer for use in timing a duration of a prescribed network security authentication interval of the security measure, wherein upon an expiration of said authentication timer, the security measure prevents booting up of the operating system.

2. The computer system of claim 1, wherein the security measure further enables said processor to communicate an authentication request to the prescribed network server, causes said processor to await a network controlled security authentication response, and resets said authentication tinter to the network security authentication interval in response to the network controlled security authentication response.

3. The computer system of claim 2, further wherein upon the expiration of said authentication timer, the security measure prevents booting of the operating system by said processor until the network controlled security authentication response has been received and resets said authentication timer to the network security authentication interval in response to receipt of the network controlled security authentication response.

4. The computer system of claim 3, wherein the prescribed network security authentication interval is a fixed interval.

5. The computer system of claim 3, wherein the prescribed network security authentication interval is an interval subject to being changed in accordance with requirements of a particular network controlled security implementation.

6. The computer system of claim 1, wherein said BIOS firmware further includes a power on self test (POST), wherein further the security measure controls an execution of the power on self test by said processor.

7. The computer system of claim 2, further comprising:
a setup response timer, said setup response timer for timing out the awaiting of the network controlled security authentication response from the network server.

8. The computer system of claim 2, wherein said BIOS firmware further includes executable instructions to be carried out by said processor for determining if the network controlled security authentication response is a valid response, and if valid, then resetting said authentication timer.

9. The computer system of claim 1, further comprising a motherboard, wherein said at least one memory is disposed upon said motherboard.

10. The computer system of claim 1, wherein said communicating device includes a network interface card.

11. The computer system of claim 1, wherein said communicating device includes a modem.

12. The computer system of claim 1, wherein said authentication timer includes a software timer using an encrypted count, the encrypted count being stored in a non-volatile random access memory of said at least one memory.

13. The computer system of claim 12, wherein the software timer is updated with the use of periodic system management interrupts.

14. The computer system of claim 12, wherein the software timer is updated with the use of periodic system configuration interrupts.

15. A computer network for implementing network controlled security of a computer system, said computer network comprising:
a network server for administering network controlled security; and
at least one computer system, said at least one computer system including:
at least one processor;
at least one memory;
operating system software for use in booting up an operating system;
device for communicating with said network server;
basic input output system (BIOS) firmware including a network controlled security measure, the security measure implemented by the processor prior to a booting up of the operating system and in conjunction with said network server, the security measure configured to require an authentication from the prescribed network server to operate and, without authentication, the security measure configured to halt practical operation of the computer system until such time as the network authentication is received, wherein the security measure controls the booting up of the operating system by said processor by one selected from allowing booting up and preventing booting up; and
an authentication timer, the authentication timer for use in timing a duration of a prescribed network security authentication interval of the security measure, wherein upon an expiration of the authentication timer, the security measure prevents booting up of the operating system.

16. The computer network of claim 15, wherein the security measure further enables the processor to communicate an authentication request to said network server, causes the processor to await a network controlled security authentication response, and resets the authentication timer to the network security authentication interval in response to the network controlled security authentication response.

17. The computer network of claim 16, further wherein upon the expiration of the authentication timer, the security measure prevents booting of the operating system by the processor until the network controlled security authentication response has been received and resets the authentication timer to the network security authentication interval in response to receipt of the network controlled security authentication response.

18. The computer network of claim 15, wherein the authentication timer includes a software timer using an encrypted count, the encrypted count being stored in a nonvolatile random access memory of the at least one memory.

19. A method of network controlled security for a computer system administered in conjunction with a prescribed network server comprising:
providing at least one processor;
providing at least one memory;
operating system software for use in booting up an operating system;
communicating with the prescribed network server;
providing basic input output system (BIOS) firmware including a network controlled security measure, the security measure implemented by the processor prior to a booting up of the operating system and in conjunction with the prescribed network server, the security measure configured to require an authentication from the prescribed network server to operate and, without authentication, the security measure configured to halt practical operation of the computer system until such time as the network authentication is received, wherein the security measure controls the booting up of the operating system by said processor by one selected from allowing booting up and preventing booting up; and providing an authentication timer, the authentication timer for use in timing a duration of a prescribed network security authentication interval of the security measure, wherein upon an expiration of the authentication timer, the security measure prevents booting up of the operating system.

20. The method of claim 19, wherein the security measure further enables the processor to communicate an authentication request to the prescribed network server, causes the processor to await a network controlled security authentication response, and resets the authentication timer to the network security authentication interval in response to the network controlled security authentication response.

21. The method of claim 20, further wherein upon the expiration of the authentication timer, the security measure prevents booting of the operating system by the processor until the network controlled security authentication response has been received and resets the authentication timer to the network security authentication interval in response to receipt of the network controlled security authentication response.

22. The method of claim 21, wherein the prescribed network security authentication interval is a fixed interval.

23. The method of claim 21, wherein the prescribed network security authentication interval is an interval subject to being changed in accordance with requirements of a particular network controlled security implementation.

24. The computer system of claim 19, wherein the BIOS firmware further includes a power on self test (POST), wherein further the security measure controls an execution of the power on self test by the processor.

25. The method of claim 20, further comprising:
providing a setup response timer, the setup response timer for timing out the awaiting of the network controlled security authentication response from the network server.

26. The method of claim 20, wherein the BIOS firmware further includes executable instructions to be carried out by the processor for determining if the network controlled security authentication response is a valid response, and if valid, then resetting the authentication timer.

27. The method of claim 19, further comprising:
providing a motherboard, wherein the at least one memory is disposed upon the motherboard.

28. The method of claim 19, wherein communicating with the prescribed network server includes using a network interface card.

29. The method of claim 19, wherein communicating with the prescribed network server includes using a modem.

30. The method of claim 19, wherein the authentication timer includes a software timer using an encrypted count, the encrypted count being stored in a non-volatile random access memory of the at least one memory.

31. The method of claim 30, wherein the software timer is updated with the use of periodic system management interrupts.

32. The method of claim 30, wherein the software timer is updated with the use of periodic system configuration interrupts.

* * * * *